(12) United States Patent
Kato

(10) Patent No.: US 7,403,286 B2
(45) Date of Patent: Jul. 22, 2008

(54) SPECTROSCOPIC ANALYZING APPARATUS

(75) Inventor: Hisaki Kato, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 97 days.

(21) Appl. No.: 11/441,356

(22) Filed: May 26, 2006

(65) Prior Publication Data

US 2006/0279733 A1 Dec. 14, 2006

Related U.S. Application Data

(60) Provisional application No. 60/684,994, filed on May 27, 2005.

(51) Int. Cl.
*G01J 3/28* (2006.01)
(52) U.S. Cl. .................................... 356/328
(58) Field of Classification Search ................ 356/300, 356/302, 305, 317, 320, 326, 328, 334
See application file for complete search history.

(56) References Cited

U.S. PATENT DOCUMENTS

| 4,060,327 A * | 11/1977 | Jacobowitz et al. ......... 356/328 |
| 2006/0279733 A1 | 12/2006 | Kato |

FOREIGN PATENT DOCUMENTS

| EP | 0 768 517 | 4/1997 |
| JP | 57-60231 | 4/1982 |
| JP | 62-234244 | 10/1987 |
| JP | 2001-159610 | 6/2001 |
| WO | WO 98/37389 | 8/1998 |
| WO | WO 03/004982 | 1/2003 |
| WO | WO 2005/116595 | 12/2005 |

* cited by examiner

*Primary Examiner*—F. L. Evans
*Assistant Examiner*—Abdullahi Nur
(74) *Attorney, Agent, or Firm*—Drinker Biddle & Reath LLP

(57) ABSTRACT

The present invention relates to a spectroscopic analyzing apparatus having a structure for enabling detection of a continuous spectrum over an overall detecting region by sharing the overall detection wavelength range to a plurality of detectors. The spectroscopic analyzing apparatus has a spectroscope, a plurality of detectors, and direction changers provided in connection with one or more detectors among the plurality of detectors. The spectroscope separates incident light into one or more wavelength components. The respective detectors are arranged such that the optical path lengths from the spectroscope to the centers of the photodetecting faces thereof are made coincident with one another. The respective direction changers are arranged on the optical paths of the wavelength components that propagate from the spectroscope to the detectors, and changes the propagation directions of the wavelength components, whereby the direction changers function to adjust the optical path lengths of the wavelength components.

12 Claims, 5 Drawing Sheets

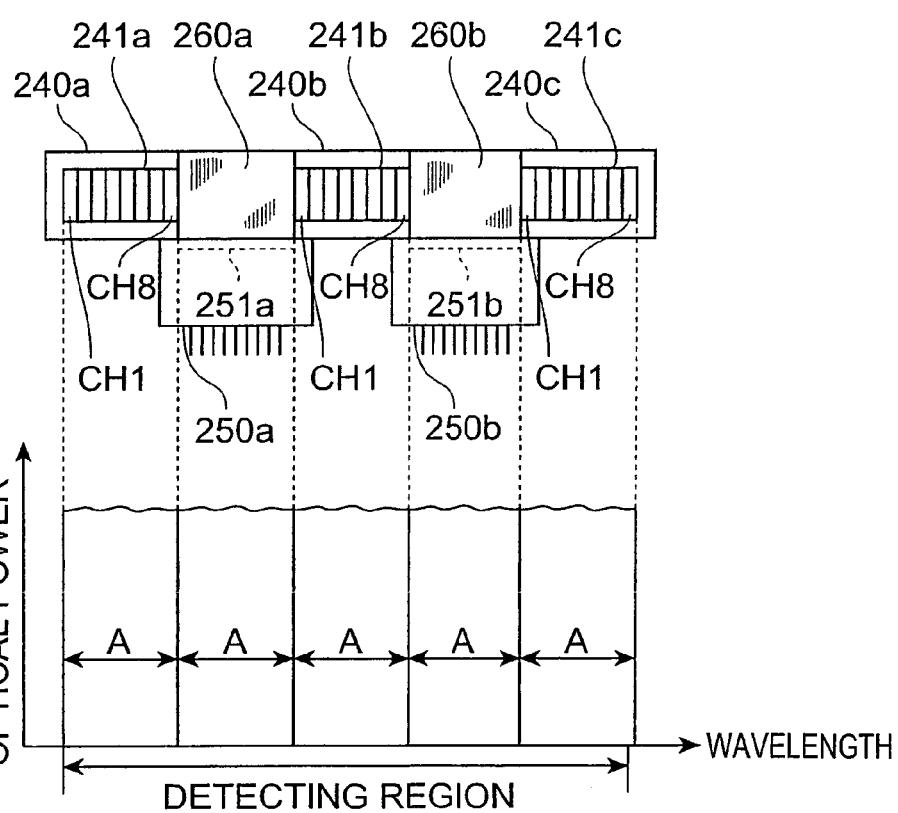

SPECTROSCOPIC ANALYZING APPARATUS

CROSS-REFERENCE TO RELATED APPLICATION

This application claims priority to Provisional Application Ser. No. 60/684,994 filed on May 27, 2005 by the same Applicant, which is hereby incorporated by reference in its entirety.

BACKGROUND OF THE INVENTION

1. Field of the Invention

The present invention relates to a spectroscopic analyzing apparatus applicable to spectroscopic analysis of light with a continuous spectrum over a broad wavelength range.

2. Related Background Art

In general, a spectroscopic analyzing apparatus is used to perform qualitative analysis and quantitative analysis of elements contained in a sample. For example, a spectroscopic analyzing apparatus disclosed in Japanese Published Unexamined Patent Application No. 2001-159610 comprises a diffraction grating (spectroscope) for spectrally diffracting emitted light or fluorescent light from the sample, and a plurality of detectors prepared: for the respective specific wavelength components. A multi-anode type photomultiplier, in which plural anodes is provided in connection with the light incident positions, is applied to a spectroscopic analyzing apparatus disclosed in WO2003/004982. In the multi-anode type photomultiplier as described above, photodetecting regions are arranged linearly or two-dimensionally, and the outputs corresponding to the light incident positions can be obtained. In particular, in the multi-anode type photomultiplier having the photodetecting regions arranged linearly, outputs of about 8 to 32 channels can be obtained in general. Therefore, a continuous spectrum can be detected by guiding the wavelength components from the spectroscope to the photodetecting face of the multi-anode type photomultiplier although the wavelength range is limited. In other words, the multi-anode type photomultiplier has the same function as the construction that a plurality of photomultipliers are provided in connection with the respective channels, and for example, when the anodes are linearly arranged, the multi-anode type photomultiplier can function as a line sensor.

SUMMARY OF THE INVENTION

The inventors have studied the prior art described above in detail, and as a result, have found problems as follows.

Namely, when a continuous spectrum over a broad wavelength range which cannot be covered by one detector is detected, it is necessary to arrange a plurality of detectors which are similar to a detector (multi-anode type photomultiplier) of a spectroscopic analyzing apparatus disclosed in the above-mentioned WO2003/004982.

FIGS. 1A and 1B are diagrams showing the construction of a spectroscopic analyzing apparatus 100 according to a comparative example that is newly prepared by the inventor to explain the problem of the prior art. As shown in FIG. 1A, the spectroscopic analyzing apparatus 100 according to the comparative example comprises a collimate lens 110 for collimating emitted light or fluorescent light from a sample, a light shielding plate 120 having a slit 121, a diffraction grating 130 (a reflection type spectroscope) for reflecting wavelength components included in light beam passing through the slit 121 at inherent angles to separate the wavelength components from each other, and a plurality of detectors 140a to 140d respectively taking charge of the associated wavelength ranges divided from the detecting region. FIG. 1B is a diagram showing the plurality of detectors 140a to 140d when observed in the direction from the diffraction grating 130 to the plurality of detectors 140a to 140d, that is, in the direction indicated by an arrow S1 of FIG. 1A. The plurality of detectors 140a to 140d respectively have photodetecting faces 141a to 141d, and the plurality of detectors 140a to 140d are arranged so as to be perpendicular to the reference plane P1. Each of the photodetecting faces 141a to 141d is divided into eight parts for a first channel CH1 to an eighth channel CH8.

However, since an insensitive region exists around each of the photodetecting faces 141a to 141d of the plurality of detectors 140a to 140d, the spectrum detected by these plurality of detectors 140a to 140d has such a shape that a sensitive region A and an insensitive region B alternately appear, as shown in FIG. 1C. Therefore, the spectroscopic analyzing apparatus according to the comparative example shown in FIGS. 1A and 1B has a problem that the spectroscopic analyzing apparatus cannot detect a continuous spectrum.

In order to overcome the above-mentioned problems, it is an object of the present invention to provide a spectroscopic analyzing apparatus having a structure for enabling detection of a continuous spectrum over a broad wavelength range.

A spectroscopic analyzing apparatus according to the present invention comprises a spectroscope, a plurality of detectors respectively taking charge of the associated wavelength ranges divided from a detecting region into a plurality of wavelength ranges and, and direction changers which are provided in connection with one or more detectors among the plurality of detectors. The spectroscope separates incident light into one or more wavelength components. The respective detectors are arranged such that the optical path length from the spectroscope to the center of each of the photodetecting faces of the detectors is made coincident. Each of the direction changers is arranged on the optical path of a wavelength component that propagates from the spectroscope to the associated detector, and functions to change the propagation direction of the associated wavelength component. By providing the direction changers in connection with one or more detectors as described above, it is possible to individually change the arrangement of each detector. In this case, the positions of all detectors can be adjusted such that all wavelength components separated by the spectroscope or arbitrarily-selected desired wavelength components do not reach the insensitive regions of any detectors. Accordingly, even in the case of spectroscopic analysis of light with a continuous spectrum over a broader wavelength range than the wavelength range detectable by one detector, the wavelength components separated by the spectroscope can reach the photodetecting face of any detector. Conversely, the arrangement of the detectors can be adjusted so that a desired wavelength component can be guided to the photodetecting face of any detector, and also an unnecessary wavelength component is guided to an insensitive region (wavelength range to be detected can be freely selected).

In the spectroscopic analyzing apparatus according to the present invention, the spectroscope may be constituted by a lens optical system, however, it is preferable that the spectroscopic analyzing apparatus includes a reflection type diffraction grating for reflecting the wavelength components included in incident light at an angle inherent to each of the wavelength components. This is because the entire spectroscopic analyzing apparatus can be miniaturized. Furthermore, it is preferable that each of the detectors includes a multi-anode type photomultiplier provided with a plurality of anodes in conformity with the light incident positions. In this case, in addition to the miniaturization of the entire spectroscopic analyzing apparatus, each detector can function as a line sensor, and thus a continuous spectrum over a broad range can be efficiently detected.

Various embodiments can be considered for the arrangement of the detectors in which the wavelength components separated by the spectroscope or freely selected desired wavelength components do not reach the insensitive regions of the detectors. For example, as a first embodiment, one or more detectors among the plurality of detectors may be arranged such that the photodetecting faces thereof are perpendicular to a predetermined reference plane, while the remaining detectors are arranged such that the photodetecting faces thereof are made coincident with the reference plane. In this case, the direction changers are arranged on the optical paths of the wavelength components that propagate from the spectroscope to the remaining detectors.

In the above-mentioned first embodiment, each of the direction changers preferably includes a prism assembly for changing the propagation direction of light propagating therethrough. Each of the direction changers may include a mirror reflector. In any case, in order to miniaturize the entire spectroscopic analyzing apparatus, the respective direction changers are preferably fixed to the associated remaining detectors while covering the photodetecting faces of the associated remaining detectors. The prism assembly may be shaped such that incident light is reflected therefrom at one or more times. In this case, the prism assembly itself has a function of adjusting the optical path length of the associated wavelength component.

On the other hand, as a second embodiment, the plurality of detectors may be arranged such that the photodetecting faces thereof are made coincident with a predetermined reference plane. In this case, the direction changers are arranged on the optical paths of the wavelength components that propagate from the spectroscope to the plurality of detectors.

In the above-mentioned second embodiment, each of the direction changers may include one of a first prism assembly and a second prism assembly which are different from each other in optical path length of light propagating therethrough. In this case, the plurality of detectors are arranged so as to be classified into the first and second groups between which the length of each line segment when the optical paths of the wavelength components separated by the spectroscope are projected onto the reference plane is different. Then, the direction changers corresponding to the first prism assemblies are arranged on the optical paths of the wavelength components that propagate from the spectroscope to the respective detectors belonging to the first group out of the plurality of detectors, and the direction changers corresponding to the second prism assemblies are arranged on the optical paths of the wavelength components that propagate from the spectroscope to the respective detectors belonging to the second group out of the plurality of detectors.

In the second embodiment, in order to miniaturize the entire spectroscopic analyzing apparatus, it is also preferable that the direction changers corresponding to the first prism assemblies are fixed to the detectors while covering the photodetecting faces of the detectors belonging to the first group, and the direction changers corresponding to the second prism assemblies are fixed to the detectors while covering the photodetecting faces of the detectors belonging to the second group.

Furthermore, in the second embodiment, at least one of the direction changers may include a mirror reflector. Also in this case, each direction changer corresponding to the mirror reflector is fixed to the detector while covering the photodetecting face of the detector belonging to one of the first and second groups, whereby the entire spectroscopic analyzing apparatus can be miniaturized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 3A and 3B are diagrams showing the arrangement of detectors in the spectroscopic analyzing apparatus according to the first embodiment, and shows a detected spectrum;

DETAILED DESCRIPTION OF THE PREFERRED EMBODIMENTS

In the following, embodiments of a spectroscopic analyzing apparatus according to the present invention will be explained in detail with reference to FIGS. 2A to 5B. In the explanation of the drawings, constituents identical to each other will be referred to with numerals identical to each other without repeating their overlapping descriptions.

First Embodiment

Figure 1A:
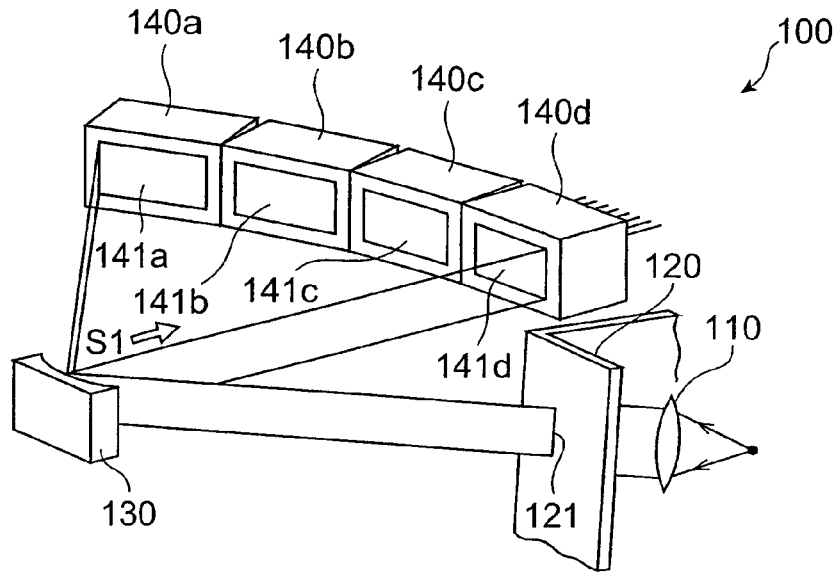
FIGS. 1A to 1C are diagrams showing the structure of a spectroscopic analyzing apparatus according to a comparative example, and show a detected spectrum.
Figure 1B:
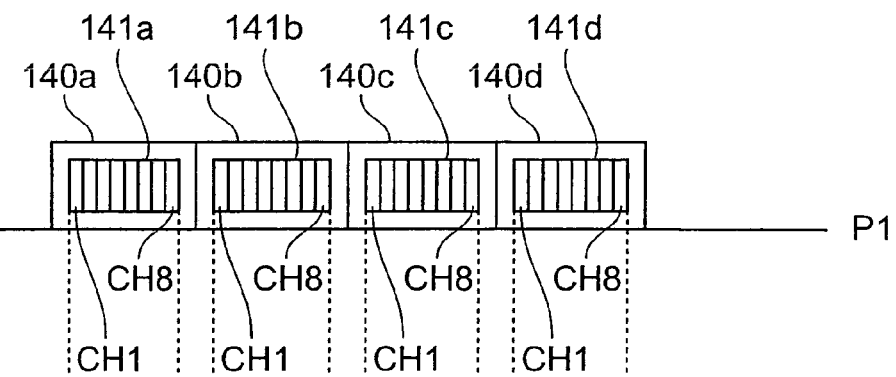
Figure 1C:
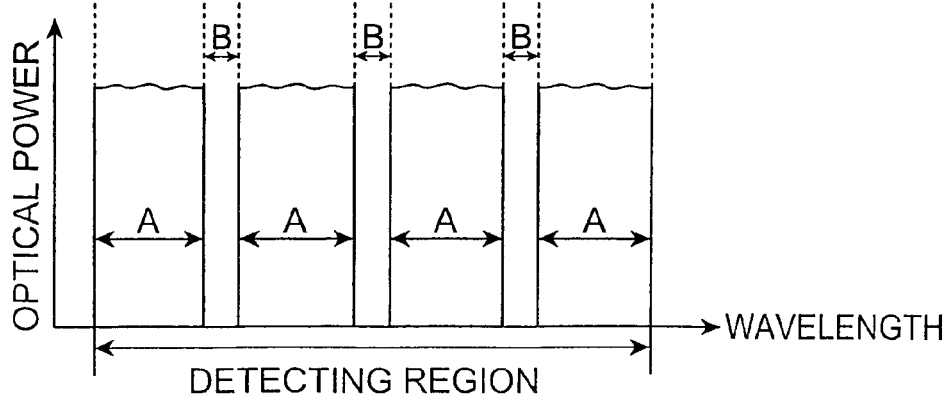
Figure 2A:
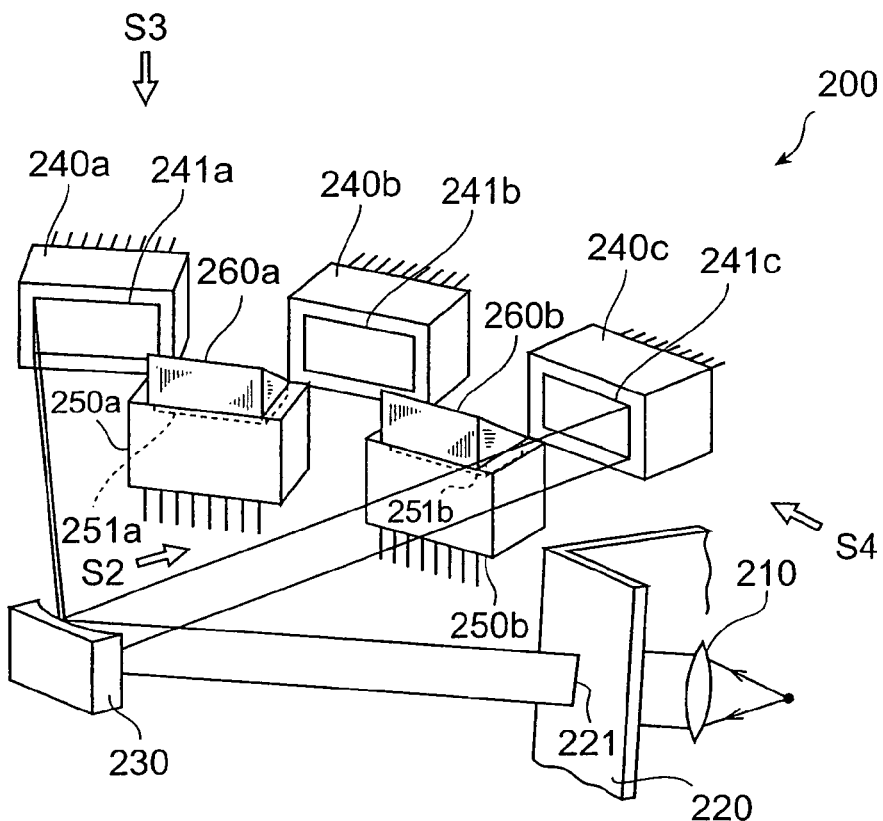
FIGS. 2A to 2C are diagrams showing a configuration of a first embodiment of a spectroscopic analyzing apparatus according to the present invention.
Figure 2B:
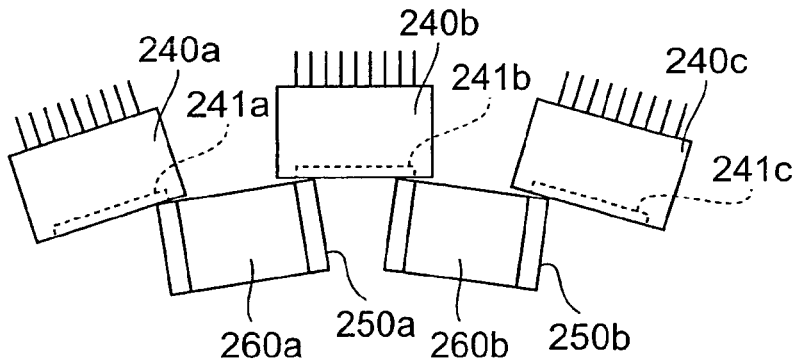
Figure 2C:
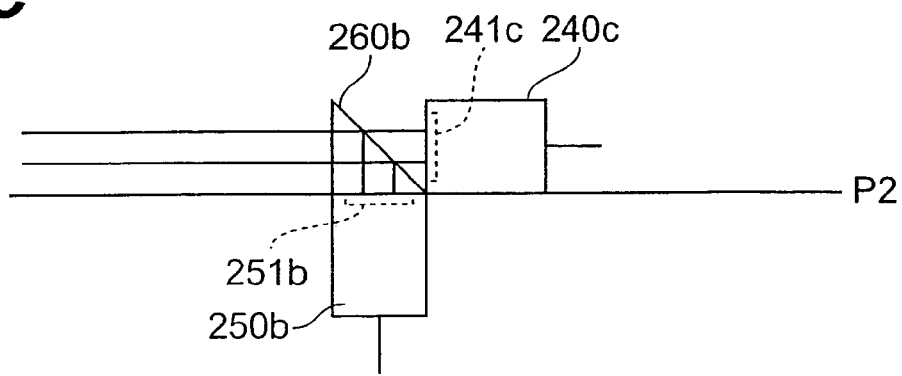

First, a first embodiment of a spectroscopic analyzing apparatus according to the present invention will be explained with reference to FIGS. 2A to 3B. FIG. 2A is a perspective view showing the configuration of the first embodiment of the spectroscopic analyzing apparatus according to the present invention, FIG. 2B is a plan view showing the arrangement of detectors when observed in the direction indicated by an arrow S3 of FIG. 2A, and FIG. 2C is a side view showing the arrangement of the detectors when observed in the direction indicated by an arrow S4 of FIG. 2A. FIG. 3A is a front view showing the arrangement of the detectors when observed in the direction indicated by an arrow S2 of FIG. 2A, and FIG. 3B shows a detected spectrum in connection with the arrangement of the detectors shown in FIG. 3A.

As in the case of the comparative example described above, the spectroscopic analyzing apparatus 200 according to the first embodiment comprises a collimate lens 210, a light shielding plate 220 having a slit 221, a diffraction grating 230 as a spectroscope, and a plurality of detectors 240a to 240c and 250a to 250b respectively having photodetecting faces 241a to 241c and 251a to 251b. In the first embodiment, however, prism assemblies 260a and 260b (triangular prisms) are further provided as direction changers for changing the propagation direction of wavelength components that respectively propagate to the detectors 250a and 250b, whereby the detectors 240a to 240c and 250a to 250b are arranged such that all wavelength components separated by the diffraction grating 230 do not reach insensitive regions of the detectors 240a to 240c and 250a to 250b.

As described above, the prism assemblies 260a and 260b as the direction changers are respectively arranged on the optical paths of the wavelength components that propagate from the diffraction grating 230 to the corresponding detectors 250a and 250b, and function to change the propagation directions of the wavelength components concerned. Therefore, even in the case of spectroscopic analysis of light with a continuous spectrum with a broader wavelength range than the wavelength range detectable by one detector, each of all wavelength components separated by the diffraction grating 230 can reach the photodetecting faces 241a to 241c and 251a to 251b of any one of the detectors 240a to 240c and 250a to 250b.

That is, in accordance with the first embodiment, as the arrangement of the detectors 240a to 240c and 250a to 250b in which all wavelength components separated by the diffraction grating 230 are prevented from reaching any insensitive region, as shown in FIG. 2B, the detectors 240a to 240c are classified into a first group, and the detectors 250a to 250b are classified into a second group. These first and second groups are set such that the lengths of line segments when the optical paths of the wavelength components separated by the diffraction grating 230 are projected onto a reference plane P2 (see FIG. 2C) are different between the first and second groups. In the first embodiment, the length of the projected line segment of the first group is set to be longer than the length of the projected line segment of the second group.

Here, the prism assemblies 260a and 260b are fixed to the detectors 250a and 250b belonging to the second group under the state that the respective photodetecting faces 251a and 251b are covered by the prism assemblies 260a and 260b, and thereby the detectors 240a to 240c and 250a to 250b are arranged as shown in FIG. 2C. That is, the detectors 240a to 240c belonging to the first group are arranged such that the photodetecting faces 241a to 241c are perpendicular to the reference plane P2, and the detectors 250a and 250b belonging to the second group are arranged such that the photodetecting faces 251a and 251b are made coincident with the reference plane P2. By applying the prism assemblies 260a and 260b to the detectors 250a and 250b belonging to the second group, the optical path lengths of the wavelength components directing from the diffraction grating 230 to the centers of the respective photodetecting faces can be made coincident with each other even when the lengths of the line segments of the optical paths projected on the reference plane P2 are different from each other.

At this time, the detectors 240a to 240c and 250a to 250b are arranged such that each of all wavelength components separated by the diffraction grating 230 can reach one of the photodetecting faces 241a to 241c and 251a to 251b as shown in FIG. 3A. Accordingly, the continuous spectrum over the overall detecting region as shown in FIG. 3B can be detected by the spectroscopic analyzing apparatus 200 according to the first embodiment.

In the first embodiment, the prism assemblies 260a and 260b are applied as the direction changers. However, the same effect can be achieved by applying a mirror reflector.

Second Embodiment

Figure 4A:
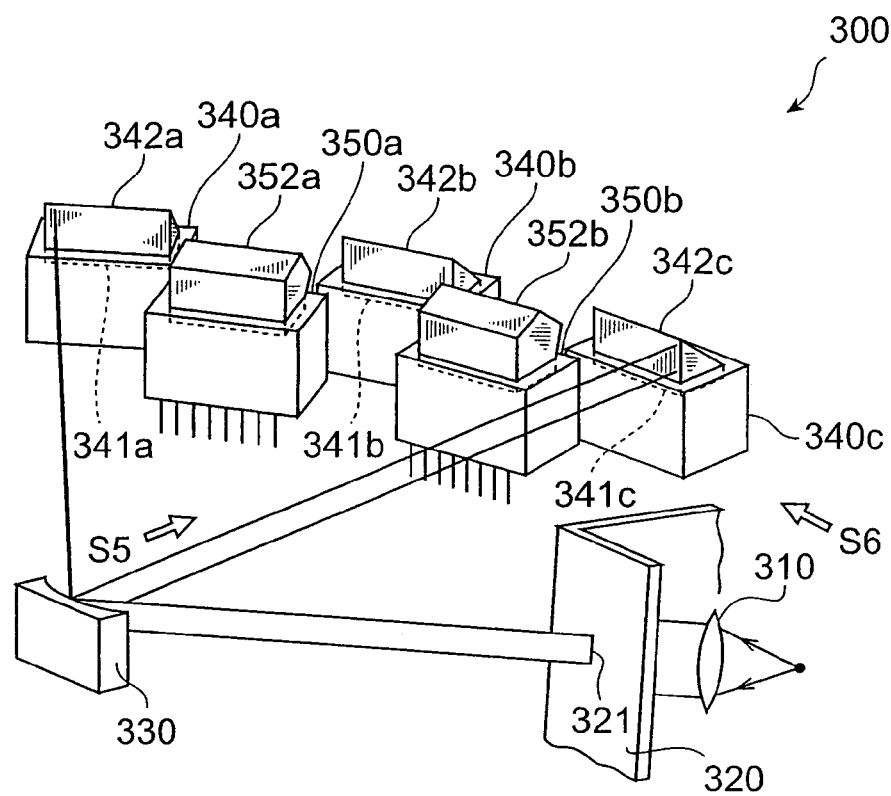
FIGS. 4A and 4B are diagrams showing a configuration of a second embodiment of the spectroscopic analyzing apparatus of the present invention.
Figure 4B:
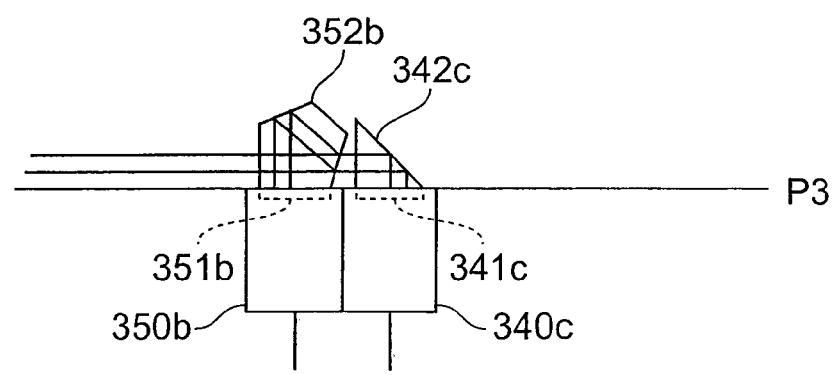
Figure 5A:
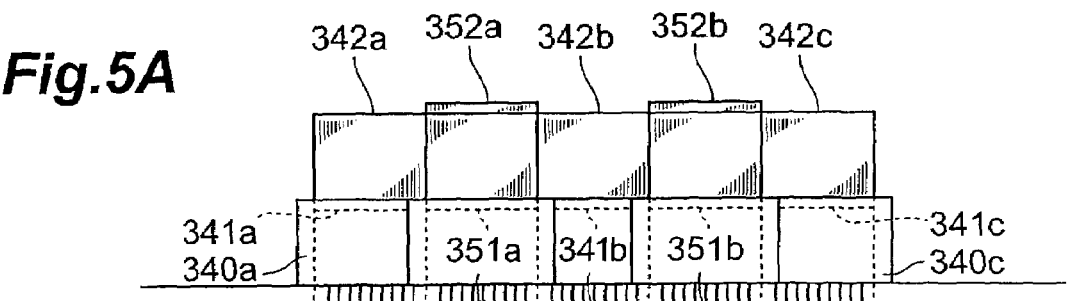
FIGS. 5A and 5B are diagrams showing the arrangement of the detectors in the spectroscopic analyzing apparatus of the second embodiment, and show a detected spectrum.
Figure 5B:
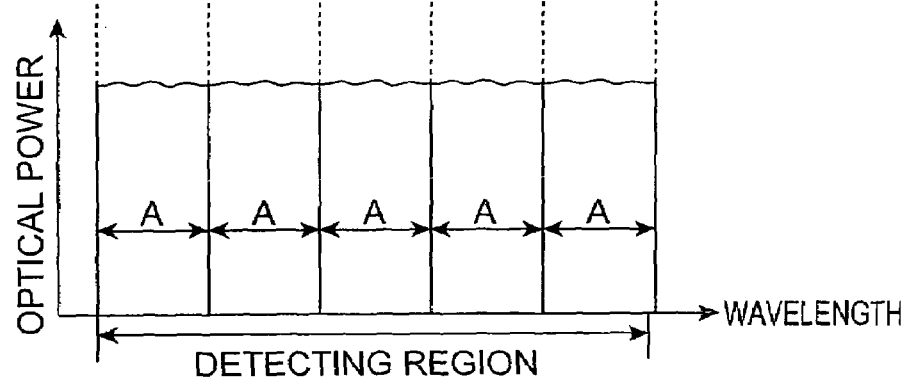

Next, a second embodiment of the spectroscopic analyzing apparatus according to the present invention will be explained with reference to FIGS. 4A to 5B. FIG. 4A is a perspective view showing a configuration of the second embodiment of the spectroscopic analyzing apparatus according to the present invention, and FIG. 4B is a plan view showing the arrangement of the detectors when observed in the direction indicated by an arrow S6 of FIG. 4A. FIG. 5A is a front view showing the arrangement of the detectors when observed in the direction indicated by an arrow S5 of FIG. 4A, and FIG. 5B shows a detected spectrum in connection with the arrangement of the detectors shown in FIG. 5A.

The spectroscopic analyzing apparatus 300 according to the second embodiment comprises a collimator lens 310, a light shielding plate 320 having a slit 321, a diffraction grating 330 as a spectroscope, and a plurality of detectors 340a to 340c and 350a to 350b respectively having photodetecting faces 341a to 341c and 351a to 351b as in the case of the first embodiment. However, the second embodiment is different from the first embodiment in that the plurality of detectors 340a to 340c and 350a to 350b are arranged such that the photodetecting faces 341a to 341c, 351a to 351b are made coincident with the reference plane P3 (see FIG. 4B).

Furthermore, in the second embodiment, as in the case of the first embodiment, the detectors 340a to 340c are classified into a first group, and the detectors 350a to 350b are classified into the second group. The first and second groups are set such that the lengths of the line segments when the respective optical paths of the wavelength components separated by the diffraction grating 330 are projected onto the reference plane P3 (see FIG. 4B) are different between the first and second groups. In the second embodiment, the length of the projected line segment of the first group is set to be longer than that of the second group.

Here, in accordance with the second embodiment, in order to adjust the difference in optical path length among the respective wavelength components which is caused by the difference in the length of the projected line segments, first prism assemblies 342a to 342c (triangular prisms) are fixed to the detectors 340a to 340c belonging to the first group while covering the photodetecting faces 341a to 341c thereof On the other hand, second prism assemblies 352a and 352b (pentangular prisms or assemblies each of which is constituted by attaching a plurality of triangular prisms) are fixed to the detectors 350a and 350b belonging to the second group while covering the photodetecting faces 351a and 351b. The first prism assemblies 342a to 342c and the second prism assemblies 35,2a and 352b are prism assemblies in which the optical path lengths of light propagating therethrough are different from each other. In the second embodiment, by increasing the propagation distances of the second prism assemblies 352a and 252b fixed to the detectors belonging to the second group nearer to the diffraction grating 330, the optical path lengths of the wavelength components directing from the diffraction grating 330 to the centers of the respective photodetecting faces can be made coincident with each other even when the line segment lengths of the optical paths projected onto the reference plane 3 are different from one another. That is, the second prism assemblies 352a and 352b are designed to have such a shape that light is reflected only twice in the second prism assemblies 352a and 352b. Therefore, the second prism assemblies 352a and 352b themselves have a function of adjusting the optical path lengths of the corresponding wavelength components.

At this time, the detectors 340a to 340c and 350a to 350b are arranged as shown in FIG. 4B. That is, the detectors 340a to 340c belonging to the first group and the detectors 350a and 350b belonging to the second group are arranged such that the respective photodetecting faces 341a to 341c and 351a to 351b are made coincident with the reference plane P3.

In accordance with the above-mentioned configuration, the detectors 340a to 340c and 350a to 350b are arranged such that each of all wavelength components separated by the diffraction grating 330 can reach one of the photodetecting faces 341a to 341c and 351a to 351b. Accordingly, by the spectroscopic analyzing apparatus 300 according to the second embodiment, the continuous spectrum over the whole detecting region as shown in FIG. 5B can also be detected.

Even in the second embodiment, the first prism assemblies 342a to 342c and the second prism assemblies 352a and 352b are applied as the direction changers, however, the same effect can be achieved even when the mirror reflector is applied.

As described above, in accordance with the spectroscopic analyzing apparatus according to the present invention, spectroscopic analysis can be performed not only on faint light such as emitted light or fluorescent light from a sample, but also on light having a continuous spectrum over a wavelength range which is too broad to be covered by one detector.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A spectroscopic analyzing apparatus, comprising:
   a spectroscope for separating incident light into one or more wavelength components;
   a plurality of detectors each taking charge of the associated one of a plurality of wavelength ranges that are divided from a detection wavelength range, said detectors being optically connected to said spectroscope and arranged such that optical path lengths from said spectroscope to respective photodetecting faces of said detectors are made coincident with each other, each of said detectors having a sensitive region narrower than the spectrum band of light reaching from said optically connected spectroscope to said detectors; and
   direction changers provided in connection with one or more detectors among said plurality of detectors, said direction changers being arranged on optical paths of the wavelength components that propagate from said spectroscope to said associated detectors, and functioning to change the propagation directions of the wavelength components,
   wherein said plurality of detectors are arranged so as to prevent the desired wavelength components separated by said spectroscope from reaching insensitive regions of said plurality of detectors, by using the function of said direction changers.

2. A spectroscopic analyzing apparatus according to claim 1, wherein said spectroscope includes a reflection type diffraction grating for reflecting the wavelength components contained in the incident light at the respective angles inherent to the wavelength components.

3. A spectroscopic analyzing apparatus, comprising:
   a spectroscope for separating incident light into one or more wavelength components;
   a plurality of detectors each taking charge of the associated one of a plurality of wavelength ranges that are divided from a detection wavelength range, said detectors being arranged such that optical path lengths from said spectroscope to respective photodetecting faces of said detectors are made coincident with each other; and
   direction changers provided in connection with one or more detectors among said plurality of detectors, said direction changers being arranged on optical paths of the wavelength components that propagate from said spectroscope to said associated detectors, and functioning to change the propagation directions of the wavelength components,
   wherein said plurality of detectors are arranged so as to prevent the desired wavelength components separated by said spectroscope from reaching insensitive regions of said plurality of detectors, by using the function of said direction changers, and
   wherein each of said plurality of detectors includes a multi-anode type photomultiplier in which a plurality of anodes are provided in connection with light incident positions.

4. A spectroscopic analyzing apparatus, comprising:
   a spectroscope for separating incident light into one or more wavelength components;
   a plurality of detectors each taking charge of the associated one of a plurality of wavelength ranges that are divided from a detection wavelength range, said detectors being arranged such that optical path lengths from said spectroscope to respective photodetecting faces of said detectors are made coincident with each other; and
   direction changers provided in connection with one or more detectors among said plurality of detectors, said direction changers being arranged on optical paths of the wavelength components that propagate from said spectroscope to said associated detectors, and functioning to change the propagation directions of the wavelength components,
   wherein said plurality of detectors are arranged so as to prevent the desired wavelength components separated by said spectroscope from reaching insensitive regions of said plurality of detectors, by using the function of said direction changers,
   wherein one or more detectors among said plurality of detectors are arranged such that the photodetecting faces thereof are perpendicular to a predetermined reference plane, and the remaining detectors are arranged such that the photodetecting faces thereof are made coincident with the reference plane, and
   wherein said direction changers are arranged on the optical paths of the wavelength components that propagate from said spectroscope to the remaining detectors.

5. A spectroscopic analyzing apparatus according to claim 4, wherein each of said direction changers includes a prism assembly for changing the propagation direction of light propagating therethrough.

6. A spectroscopic analyzing apparatus according to claim 5, wherein said direction changers are respectively fixed to the associated remaining detectors while covering the photodetecting faces of the associated remaining detectors.

7. A spectroscopic analyzing apparatus according to claim 4, wherein each of said direction changers includes a mirror reflector.

8. A spectroscopic analyzing apparatus according to claim 7, wherein said direction changers are respectively fixed to the associated remaining detectors while covering the photodetecting faces of the associated remaining detectors.

9. A spectroscopic analyzing apparatus, comprising:
a spectroscope for separating incident light into one or more wavelength components;
a plurality of detectors each taking charge of the associated one of a plurality of wavelength ranges that are divided from a detection wavelength range, said detectors being arranged such that optical path lengths from said spectroscope to respective photodetecting faces of said detectors are made coincident with each other; and
direction changers provided in connection with one or more detectors among said plurality of detectors, said direction changers being arranged on optical paths of the wavelength components that propagate from said spectroscope to said associated detectors, and functioning to change the propagation directions of the wavelength components,
wherein said plurality of detectors are arranged so as to prevent the desired wavelength components separated by said spectroscope from reaching insensitive regions of said plurality of detectors, by using the function of said direction changers,
wherein said plurality of detectors are arranged such that the photodetecting faces thereof are made coincident with a predetermined reference plane,
wherein said direction changers are respectively arranged on the optical paths of wavelength components that propagate from said spectroscope to said plurality of detectors,
wherein each of said direction changers includes one of a first prism assembly and a second prism assembly that are different from each other in the optical path length of light propagating therethrough,
wherein said plurality of detectors are respectively arranged so as to be classified into first and second groups between which the lengths of line segments defined by projecting the optical paths of the wavelength components separated by said spectroscope onto the reference plane are different, and
wherein said direction changers corresponding to said first prism assemblies are arranged on the optical paths of the wavelength components that propagate from said spectroscope to the detectors belonging to the first group among said plurality of detectors whereas said direction changers corresponding to said second prism assemblies are arranged on the optical paths of the wavelength components that propagate from said spectroscope to the directors belonging to the second group among said plurality of detectors.

10. A spectroscopic analyzing apparatus according to claim 9, wherein said direction changers corresponding to said first prism assemblies are respectively fixed to the detectors belonging to the first group while covering the photodetecting faces of the detectors concerned, and
wherein said direction changers corresponding to said second prism assemblies are respectively fixed to the detectors belonging to the second group while covering the photodetecting faces of the detectors concerned.

11. A spectroscopic analyzing apparatus, comprising:
a spectroscope for separating incident light into one or more wavelength components;
a plurality of detectors each taking charge of the associated one of a plurality of wavelength ranges that are divided from a detection wavelength range, said detectors being arranged such that optical path lengths from said spectroscope to respective photodetecting faces of said detectors are made coincident with each other; and
direction changers provided in connection with one or more detectors among said plurality of detectors, said direction changers being arranged on optical paths of the wavelength components that propagate from said spectroscope to said associated detectors, and functioning to change the propagation directions of the wavelength components,
wherein said plurality of detectors are arranged so as to prevent the desired wavelength components separated by said spectroscope from reaching insensitive regions of said plurality of detectors, by using the function of said direction changers,
wherein said plurality of detectors are arranged such that the photodetecting faces thereof are made coincident with a predetermined reference plane,
wherein said direction changers are respectively arranged on the optical paths of wavelength components that propagate from said spectroscope to said plurality of detectors, and
wherein at least one of said direction changers includes a mirror reflector.

12. A spectroscopic analyzing apparatus according to claim 11, wherein said direction changers corresponding to the mirror reflections are respectively fixed to the detectors belonging to one of the first and second groups while covering the photodetecting faces of the detectors concerned.

* * * * *